United States Patent [19]

Binsack

[11] 3,996,197

[45] Dec. 7, 1976

[54] METHOD OF PREPARING POLYBENOXAZINDIONE POLYMERS FROM AMINOPHENOXY SALICYCLIC ACID COMPOUNDS

[75] Inventor: Rudolf Binsack, Krefeld, Germany

[73] Assignee: Bayer Aktiengesellschaft, Leverkusen, Germany

[22] Filed: Dec. 31, 1974

[21] Appl. No.: 537,664

Related U.S. Application Data

[63] Continuation-in-part of Ser. No. 374,878, June 29, 1973, abandoned.

[30] Foreign Application Priority Data

July 1, 1972  Germany ............................ 2232462

[52] U.S. Cl. ...................... 260/47 CP; 260/47 XA

[51] Int. Cl.² ........................................ C08G 73/06
[58] Field of Search ........... 260/47 CP, 78 TF, 519, 260/47 XA

[56] References Cited

UNITED STATES PATENTS

| | | | |
|---|---|---|---|
| 2,904,537 | 9/1959 | Brinker et al. | 260/78 |
| 3,230,196 | 1/1966 | Moyer, Jr. et al. | 260/47 |
| 3,676,399 | 7/1972 | Lindsey et al. | 260/47 |

Primary Examiner—Lester L. Lee
Attorney, Agent, or Firm—Plumley and Tyner

[57] ABSTRACT

New aminophenoxy salicyclic acid compounds which can be used to prepare polybenz-oxazin dione.

5 Claims, No Drawings

METHOD OF PREPARING POLYBENOXAZINDIONE POLYMERS FROM AMINOPHENOXY SALICYCLIC ACID COMPOUNDS

This invention relates to novel aminophenoxy salicylic acid compounds corresponding to the general formula:

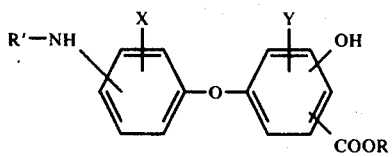

in which
R represents a hydrogen atom, a $C_1$ to $C_4$ alkyl radical, a $C_7$ to $C_{10}$ aralkyl radical or a one-linkage $C_6$ to $C_{10}$ aromatic radical;
R' represents a hydrogen atom, an aliphatic $C_2$ to $C_5$ acyl radical, an aromatic $C_7$ to $C_{10}$ acyl radical, a carboxylate radical COOR'' where R'' represents an alkyl radical having 1 to 4 carbon atoms, or a $C_7$ to $C_{10}$ aralkyl radical and
X and Y, same or different, represent a hydrogen atom, chlorine, bromine or a $C_1$ to $C_4$ alkyl radical.

R means preferably a methyl, ethyl, isopropyl, n-propyl, n-(iso-, t-)butyl radical, a phenylmethyl, phenylethyl, phenylpropyl or phenylbutyl radical, a phenyl or naphthyl radical. Most preferably R means a hydrogen atom or a phenyl radical.

R' is derived preferably from a radical of the general formula $CH_3(CH_2)_nCO-$, wherein n is a whole number from 0 to 3, from a radical of the general formula $C_6H_5(CH_2)_nCO-$, wherein n is a whole number from 0 to 2, or from a carboxylate radical having the general formula $-COOR''$, wherein R'' means a methyl, ethyl, n-(sio-)-propyl, n-(iso-, t-)butyl, phenylmethyl, phenylpropyl or phenylbutyl radical. Most preferably R' means a hydrogen atom or an acetyl radical.

Most preferably R' represents COOR'' as defined above and R, X and Y are defined as above.

Also most preferably X represents chlorine, bromine or a $C_1$ to $C_4$ alkyl radical and R, R' and Y are defined as above.

As representatives of the new compounds are mentioned:
4-(2-aminophenoxy)-salicyclic acid (phenylester)
5-(4-aminophenoxy)-salicyclic acid (phenylester)
5-(2-aminophenoxy)-salicyclic acid (phenylester)
4-(4-aminophenoxy)-salicyclic acid (phenylester)
4-(4-acetaminophenoxy)-salicyclic acid (phenylester)
5-(4-acetaminophenoxy)-salicyclic acid (phenylester)
5-(2-acetaminophenoxy)-salicyclic acid (phenylester)
4-(2-chloro-4-aminophenoxy)-salicyclic acid (phenylester)
5-(2-chloro-4-aminophenoxy)-salicyclic acid (phenylester)
4-(4-chloro-2-aminophenoxy)-salicyclic acid (phenylester)
5-(4-chloro-2-aminophenoxy)-salicyclic acid (phenylester)
4-(2-aminophenoxy)-salicyclic acid (methylester)
5-(4-aminophenoxy)-salicyclic acid (ethylester)
5-(2-aminophenoxy)-salicyclic acid (propylester)
4-(4-aminophenoxy)-salicyclic acid (methylester)
4-(4-acetaminophenoxy)-salicyclic acid (propylester)
5-(4-acetaminophenoxy)-salicyclic acid (methylester)
5-(2-acetaminophenoxy)-salicyclic acid (ethylester)
4-(2-chloro-4-aminophenoxy)-salicyclic acid (propylester)
5-(2-chloro-4-aminophenoxy)-salicyclic acid (ethylester)
4-(4-chloro-2-aminophenoxy)-salicyclic acid (methylester)
5-(4-chloro-2-aminophenoxy)-salicyclic acid (propylester)

Starting compounds for the aminophenoxy salicyclic acids according to the invention and their derivatives are the corresponding nitrophenoxy salicyclic acid compounds of the kind described, for example, in German Offenlegungsschrift No. 1,902,929.

The aminophenoxy salicyclic acids according to the invention are produced from the corresponding nitrophenoxy salicyclic acids by reducing nitro compounds in the presence of known catalysts to amino compounds by conventional methods, acylating and esterifying the amino compounds with anhydrides, carboxylic acid chlorides and with chlorocarbonic acid esters. For this reason, there are a number of possible known methods of producing N-acylated aminophenoxy salicyclic acid esters, depending upon the order in which the individual reaction stages are carried out.

The aminophenoxy salicyclic acid compounds according to the invention represent excellent intermediate products for the production of plastics, resistant to high temperatures, for example aromatic polyamides, or preferably high-temperature-resistant polybenz-1,3-oxazin-(2,4)-diones, which are obtained by condensing the products with derivatives of carbonic acid. This polycondensation into high molecular weight polybenz-1,3-oxazin-(2,4)-diones can be carried out in the presence or absence of solvents. In its preferred form, polycondensation is carried out in an aprotic, highly polar solvent, for example, N,N-dimethyl formamide; N,N-dimethyl acetamide; N,N,N',N'-tetramethyl urea; N,N,N',N',N'',N''-hexamethyl phosphoric acid triamide; tetramethylene sulphone; diphenyl sulphoxide; or dimethyl sulphoxide. The aprotic, highly polar solvents can also be used in admixture with one another or in conjunction with other aprotic, less polar solvents such as, for example, benzene, toluene, chlorobenzene, methylene chloride, carbon tetrachloride or dioxan. Dimethyl sulphoxide, in which polycondensation takes place smoothly and quickly, is the preferred solvent. The polycondensation is carried out at temperatures from 150° – 300° C, preferably at temperatures from 180° – 250° C. The derivatives of carbonic acid used are the aliphatic esters, aromatic ester or the acid halogenide.

The polymers according to the invention are particularly suitable for the production of films, resistant to high temperatures.

EXAMPLE 1

5-(4-aminophenoxy)-salicylic acid phenyl ester a. 77 g of 2,5-dihydroxybenzoic acid and 78.5 g of p-chloronitrobenzene were dissolved in 300 ml of dimethyl sulphoxide under a nitrogen atmosphere, and 40 g of sodium hydroxide and 225 ml of benzene were added to the resulting solution. The mixture was then distilled under reflux at 90° to 95° C on a water separator until no more water was separated off (about 2 hours). The benzene was distilled off in a water jet vacuum, the residue poured into 2.5 liters of water, the mixture acidified with concentrated hydrochloric and while stirring vigorously, the crude, pale brown 5-(4-nitrophenoxy)-salicylic acid which was precipitated was filtered off under suction and washed acid free with water. Drying in vacuo at 80° C gave 126 g (92% of the theoretical yield) of 5-(4-nitrophenoxy)-salicylic acid, recrystallised from methanol (and active carbon, optionally with a little water added) 120 g (87% of the theoretical) of yellow crystals melting at 193° to 194° C.

b. 220 g of 5-(4-nitrophenoxy)-salicylic acid and 21.9 g of imidazole were added at 75° C to a mixture, melted under nitrogen, of 343 g of diphenyl carbonate and 220 g of phenol, the mixture was stirred at 150° C until no more carbon dioxide was evolved (about 1 hour), 2 liters of ether were added to the solution after cooling to room temperature in order to precipitate the phenyl ester formed, the phenyl ester thus formed was filtered off under suction, washed with ether and dried in vacuo at 80° C. Yield 215 g 5-(4-nitrophenoxy)-salicyclic acid (77% of the theoretical yield) of m.p. 123° – 127° C and of m.p. 130° – 130.5° C after recrystallisation from benzene/gasoline.

Analysis: $C_{19}H_{13}NO_6$ (351.30). Calculated: 65.0%, C; 3.73%, H; 3.99%, N. Found: 64.9, C; 3.71, H; 4.02, N.

c. 515 g of 5-(4-nitrophenoxy)-salicylic phenyl ester were dissolved in 1.5 litres of dioxan and hydrogenated in an autoclave at 55° to 75° C under a hydrogen pressure of 150 to 180 atms. following the addition of 10.3 g of palladium carbon (containing 5% of palladium). Hydrogenation took 2 hours. After the catalyst had been separated off, hydrogen chloride was introduced into the filtrate until it was saturated, resulting in the precipitation of the hydrochloride of 5-(4-aminophenoxy)-salicylic acid phenyl ester which was filtered off under suction, washed with dioxan and dried in vacuo at 70° C.

Yield: 438 g (84% of the theoretical yield) of hydrochloride.

Recrystallisation of the hydrochloride from ethanol/water gave the free 5-(4-aminophenoxy)-salicylic acid phenyl ester in the form of colourless needles melting at 119° C.

Analysis: $C_{19}H_{15}NO_4$ (321.32). Calculated: 71.0%, C; 4.71%, H; 4.36%, N. Found: 70.9, C; 4.73, H; 4.68, N.

EXAMPLE 2

5-(4-aminophenoxy)-salicylic acid a. 35.75 g of the hydrochloride of 5-(4-aminophenoxy)-salicylic phenyl ester produced in accordance with Example 1c, were hydrolysed by boiling for 2 hours in a solution of 13.44 g of potassium hydroxide, 80 g of ethanol and 300 g of water. This was followed by acidification with approximately 55 ml of concentrated hydrochloric acid, the free amino acid which crystallised out was filtered off under suction after cooling and washed. After drying, the aminophenoxy salicylic acid was obtained in a substantially quantitative yield, melting at 224.5° to 225° C after recrystallisation from dimethyl formamide/water.

Analysis: $C_{13}H_{11}NO_4$ (245.23). Calculated: 63.7%, C; 4.52%, H; 5.71%, N. Found: 63.4, C; 4.59, H; 5.88, N.

b. 71 g of 5-(4-nitrophenoxy)-salicylic acid prepared in accordance with Example 1a were hydrogenated at 90° C/100 atms. in 400 ml of ethanol or methanol in the presence of 2.8 g of Raney nickel. The adsorption of hydrogen ceased after 3 hours at the longest. Following the addition of 100 ml of dimethyl acetamide, the catalyst was separated off under heat, water was added at 100° C until a haze began to form, after which the solution was heated for 20 minutes in the presence of 20 g of active carbon and the free aminophenoxy salicylic acid allowed to crystallise out after filtration, being obtained in a yield of 50 g (79% of the theoretical yield), m.p. 223° – 224° C.

EXAMPLE 3

5-(4-acetaminophenoxy)-salicylic acid a. A solution of 1.4 g of acetyl chloride in 10 ml of dioxan was added dropwise over a period of 50 minutes at 25° C to a solution of 5 g of 5-(4-aminophenoxy)-salicylic acid, prepared in accordance with Example 2, and 1 g of sodium bicarbonate in 45 ml of dimethyl acetamide, stirring continued for 1 hour at room temperature and the reaction mixture was acidified with hydrochloric acid after it had been poured into 400 ml of water. The acetaminophenoxy alicylic acid separated off was filtered off under suction, washed and recrystallised from ethanol/water in the presence of active carbon. Yield 4 g (66% of the theoretical yield), m.p. 194° – 195° C.

Analysis: $C_{15}H_{13}NO_5$ (287.26). Calculated: 62.7%, C; 4.56%, H; 4.88%, N. Found: 62.4, C; 4.54, H; 4.99, N.

b. production of polybenz-1,3-oxazin-(2,4)-diones 14,4 g of 5-(4-acetaminophenoxy)-salicyclic acid and 22 g of carbonic acid diphenylester were mixed and heated to 150 C under nitrogen atmosphere until the melt is clear. Then during one hour the reaction temperature is increased to about 220° to 250° C and the pressure decreased slowly about 1 torr. During this period the melt becomes more viscous and solidifies finally. The polybenz-1,3-oxazin-dione-(2,4) thus obtained was reduced to small pieces and extracted with methyl chloride. After the extraction 12,6 g (100% of theory) of the dried product was obtained having a relative viscosity = 1,22 (1 g polymer in 100 ml of a sulphuric acid solution).

EXAMPLE 4

4-(4-aminophenoxy)-salicylic acid phenyl ester a. 4-(4-nitrophenoxy)-salicylic acid was prepared in accordance with Example 1a from p-chloronitrobenzene and 2,4-dihydroxybenzoic acid.

Yield: 63.5% of the theoretical yield, m.p. 193° – 195° C (from methanol).

Analysis: $C_{13}H_9NO_6$ (275.21). Calculated: 56.7%, C; 3.30%, H; 5.09%, N. Found: 56.7, C; 3.27, H; 4.93, N.

b. 4-(4-nitrophenoxy)-salicylic acid phenyl ester was prepared in accordance with Example 1b by esterifying 4-(4-nitrophenoxy)-salicylic acid with diphenyl carbonate.

Yield: 60% of the theoretical yield, m.p. 118° – 119.5° C (from benzene/gasoline).

Analysis: $C_{19}H_{13}NO_6$ (351.30). Calculated: 65.0%, C; 3.73%, H; 3.99%, N. Found: 65.0, C; 3.69, H; 3.90, N.

c. 4-(4-aminophenoxy)-salicylic acid phenyl ester was prepared in accordance with Example 1c by hydrogenating 4-(4-aminophenoxy)-salicylic acid phenyl ester.

Yield: quantitative in hydrochloride form; m.p. of the free amino ester 121° C (from ethanol/water).

Analysis: $C_{19}H_{15}NO_4$ (321.32). Calculated: 71.0%, C; 4.71%, H; 4.36%, N. Found: 70.5, C; 4.61, H; 4.33, N.

d. production of polybenz-(1,3)-oxazin-dione-(2,4)

The reaction of 16 g of 4-(4-aminophenoxy)-salicylic acid phenylester and of 22 g of carbonic acid diphenylester was carried out as described under Example 3b). 12,4 g (98% of the theory) of the polymer were obtained after extraction with methyl chloride. The polybenz-1,3-oxazin-dione-(2,4) thus obtained had a relative viscosity of 1,20 which was determined as described under 3b).

EXAMPLE 5 a. 5-(2-nitrophenoxy)-salicylic acid was prepared in accordance with Example 1a from 2-chloronitrobenzene and 2,5-dihydroxybenzoic acid.

Yield: 94% of the theoretical yield, m.p. 173° – 174° C (from ethanol/water).

Analysis: $C_{13}H_9NO_6$ (275.21). Calculated: 56.7%, C; 3.30%, H; 5.09%, N. Found: 56.8, C; 3.19, H; 5.13, N.

b. 5-(2-aminophenoxy)-salicylic acid was prepared in accordance with Example 2b from 5-(2-nitrophenoxy)-salicylic acid.

Yield: 89% of the theoretical yield, m.p. 233° C (from ethanol/acetone).

Analysis: $C_{13}H_{11}NO_4$ (245.23). Calculated: 63.7%, C; 4.52%, H; 5.71%, N. Found: 63.3, C; 4.84, H; 5.95, N.

EXAMPLE 6 a. 5-(2-chloro-4-nitrophenoxy)-salicylic acid was prepared in accordance with Example 1a from 2,5-dihydroxy-benzoic acid and 3,4-dichloronitrobenzene.

Yield: 86% of the theoretical yield, m.p. 204.5° – 205.5° C (from ethanol/acetone).

b. 5-(2-chloro-4-aminophenoxy)-salicylic acid was prepared in accordance with Example 2b from 5-(2-chloro-4-nitrophenoxy)-salicylic acid.

Yield: 89% of the theoretical yield, m.p. 208° – 209.5° C (from ethanol/acetone).

Analysis: $C_{13}H_{10}ClNO_4$ (279.68). Calculated: 55.8%, C; 3.60%, H; 5.01%, N; 12.7%, Cl. Found: 55.7, C; 3.50, H; 5.42, N; 12.8, Cl.

EXAMPLE 7 a. 5-(4-chloro-2-nitrophenoxy)-salicylic acid was prepared in accordance with Example 1a from 2,5-dihydroxy-benzoic acid and 2,5-dichloronitrobenzene.

Yield: 85% of the theoretical yield, m.p. 228.5° – 230° C (from ethanol/water).

Analysis: $C_{13}H_8ClNO_6$ (309.66). Calculated: 50.4%, C; 2.60%, H; 4.52%, N; 11.5%, Cl. Found: 50.4, C; 2.79, H; 4.91, N; 11.5, cl.

b. 5-(4-chloro-2-aminophenoxy)-salicylic acid was prepared in accordance with Example 2b from 5-(4-chloro-2-nitrophenoxy)-salicylic acid.

Yield: 85% of the theoretical yield, m.p. 225° – 226° C. (from ethanol/water).

Analysis: $C_{13}H_{10}ClNO_4$ (279.68). Calculated: 55.8%, C; 3.60%, H; 5.01%, N; 12.7%, Cl. Found: 55.8, C; 3.62, H; 5.15, N; 12.7, CL.

I claim:
1. A process for the production of polybenz-1,3-oxazin(2,4)-diones, which comprises polycondensing at 150°–300° C.
   1. an aminophenoxy salicylic acid compound of the formula:

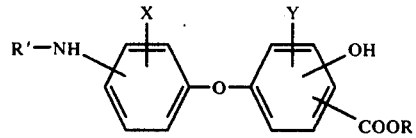

wherein
R is hydrogen, $C_1$—$C_4$-alkyl, phenyl-$C_1$—$C_4$-alkyl, phenyl, or naphthyl;
R' is hydrogen, $C_1$—$C_4$-alkyl carbonyl, phenylcarbonyl, phenyl-$C_1$—$C_2$-alkyl carbonyl, $C_1$—$C_4$-alkoxycarbonyl, or phenyl-$C_1$—$C_4$-alkoxycarbonyl; and
X and Y, independently of each other, are hydrogen, chloro, bromo, or $C_1$—$C_4$-alkyl; with
   2. carbonic acid, aliphatic carbonate, aromatic carbonate, or halide.

2. The process of claim 1 wherein R is hydrogen or phenyl.

3. The process of claim 1 wherein R' is hydrogen or acetyl.

4. The process of claim 1 wherein said aminophenoxy salicylic acid compound is polycondensed with carbonic acid diphenyl ester.

5. The process of claim 1 wherein 5-(4-acetaminophenoxy)-salicylic acid or 4-(4-aminophenoxy)-salicylic acid phenyl ester is polycondensed with carbonic acid diphenyl ester.

* * * * *